United States Patent
Wu (10) Patent No.: US 11,863,875 B2
(45) Date of Patent: Jan. 2, 2024

(54) EYEBALL TRACKING METHOD AND SYSTEM BASED ON ON-OFF OF LIGHT SOURCES

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD

( * ) Notice: Subject to any disclaimer, the term of this patent is extended or adjusted under 35 U.S.C. 154(b) by 0 days.

(21) Appl. No.: 17/819,536

(22) Filed: Aug. 12, 2022

(65) Prior Publication Data
US 2022/0394168 A1 Dec. 8, 2022

Related U.S. Application Data

(63) Continuation of application No. PCT/CN2021/118284, filed on Sep. 14, 2021.

(30) Foreign Application Priority Data

Mar. 30, 2021 (CN) .......................... 202110339663.6

(51) Int. Cl.
*H04N 23/74* (2023.01)
*G06T 7/73* (2017.01)
(Continued)

(52) U.S. Cl.
CPC ............. *H04N 23/74* (2023.01); *G06F 3/013* (2013.01); *G06T 7/20* (2013.01); *G06T 7/73* (2017.01);
(Continued)

(58) Field of Classification Search
None
See application file for complete search history.

(56) References Cited

U.S. PATENT DOCUMENTS

2019/0113968 A1 4/2019 Huang et al.

FOREIGN PATENT DOCUMENTS

| CN | 105520713 A | 4/2016 | |
|---|---|---|---|
| CN | 106598260 A * | 4/2017 | ............. G06F 3/013 |

(Continued)

OTHER PUBLICATIONS

First Office Action issued in Chinese Application No. 202110339663.6, with English translation (8 pages).
(Continued)

*Primary Examiner* — James M Anderson, II (57) ABSTRACT

An eyeball tracking method is provided. A left infrared light source and a right infrared light source are alternately turned on. A left tracking camera and a right tracking camera are controlled to correspondingly shoot the turned-on left infrared light source or the turned-on right infrared light source to form turned-on odd-frame tracking images and turned-on even-frame tracking images. Turned-off even-frame tracking images and turned-off odd-frame tracking images when the left infrared light source and the right infrared light source are alternately turned off in sequence are obtained according to the turned-on odd-frame tracking images and the turned-on even-frame tracking images. The turned-on odd-frame tracking images and the turned-off even-frame tracking images are combined to form a tracking image of one eye, and the turned-on even-frame tracking images and the turned-off odd-frame tracking images are combined to form a tracking image of the other eye.

18 Claims, 2 Drawing Sheets

(51) Int. Cl.
*G06V 40/18* (2022.01)
*G06F 3/01* (2006.01)
*G06T 7/20* (2017.01)
*H04N 5/04* (2006.01)
*H04N 5/265* (2006.01)
*H04N 23/56* (2023.01)
*H04N 23/73* (2023.01)

(52) U.S. Cl.
CPC ............... *G06V 40/18* (2022.01); *H04N 5/04* (2013.01); *H04N 5/265* (2013.01); *H04N 23/56* (2023.01); *H04N 23/73* (2023.01); *G06T 2207/20084* (2013.01); *G06T 2207/30201* (2013.01)

(56) References Cited

FOREIGN PATENT DOCUMENTS

| CN | 106598260 | A | | 4/2017 | |
|---|---|---|---|---|---|
| CN | 106768361 | A | * | 5/2017 | ............... G01J 5/00 |
| CN | 106768361 | A | | 5/2017 | |
| CN | 107633196 | A | | 1/2018 | |
| CN | 110051319 | A | | 7/2019 | |
| CN | 112527102 | A | | 3/2021 | |
| CN | 112926521 | A | | 6/2021 | |
| JP | H06269412 | A | | 9/1994 | |
| JP | 2005198743 | A | | 7/2005 | |
| JP | 2018197974 | A | | 12/2018 | |
| WO | 2018076202 | A1 | | 5/2018 | |

OTHER PUBLICATIONS

International Search Report dated Jan. 4, 2022 in International Application No. PCT/CN2021/118284, with English translation (4 pages).

* cited by examiner

EYEBALL TRACKING METHOD AND SYSTEM BASED ON ON-OFF OF LIGHT SOURCES

CROSS REFERENCE

This application is a continuation application of PCT International Application No. PCT/CN2021/118284 filed on Sep. 14, 2021, which claims priority to Chinese Application No. 202110339663.6 filed with China National Intellectual Property Administration on Mar. 30, 2021, the entirety of which is herein incorporated by reference.

TECHNICAL FIELD

The present disclosure relates to the technical field of virtual reality, and in particular to an eyeball tracking method and system based on on-off of light sources.

BACKGROUND

With the progress of science and technology and the diversified development of market demands, virtual reality systems are becoming more and more popular and have been applied in many fields, such as computer games, health and safety, industrial and educational training. As a few examples, mixed virtual reality systems are being integrated into various aspects of life such as mobile communication devices, gaming machines, personal computers, movie theaters, theme parks, university laboratories, student classrooms, and hospital exercise rooms.

At present, a mainstream technology of eyeball tracking is an eyeball tracking and eyeball sight detection technology based on image processing, and can calculate and record a position fixated by eyes in real time. According to the related art, eyeball tracking modules are arranged in an integrated virtual reality device. The eyeball tracking modules of the mainstream integrated virtual reality device include a left eyeball infrared tracking camera and a right eyeball infrared tracking camera. A certain number of infrared active light-emitting light sources are distributed according to a certain rule near the infrared tracking cameras. By using a dark pupil technology, a pupil-corneal reflection point vector is calculated by taking a corneal reflection point as a reference point to track a sight line of a human eye.

According to the above solution, two eyeball tracking modules are respectively provided on left and right eye positions of a screen of an integrated virtual reality device, and the same light sources are adopted in the two eyeball tracking modules. As a result, when in calibration or use, light rays emitted by the light sources in the two eyeball tracking modules are likely to interfere with each other, especially for a user wearing myopia glasses, calculation result errors are increased, and the position accuracy of eyeball tracking is influenced.

Therefore, there is a need for an eyeball tracking method and system based on on-off of light sources, which can effectively avoid the problem that light sources are likely to interfere with each other, and can track position areas of both eyes of a user with high accuracy and stability in real time.

SUMMARY

Embodiments of the present disclosure provide an eyeball tracking method and system based on on-off of light sources, which can solve the problems that light rays emitted by light sources are likely to interfere with each other, especially for a user wearing myopia glasses, calculation result errors are increased, and the position accuracy of eyeball tracking is influenced.

The embodiments of the present disclosure provide an eyeball tracking method based on on-off of light sources, which includes the following operations.

A left tracking camera is set to correspond to a left infrared light source and a right tracking camera is set to correspond to a right infrared light source.

The left infrared light source and the right infrared light source are alternately turned on in sequence according to odd and even numbers, and the left tracking camera and the right tracking camera are controlled to correspondingly shoot the turned-on left infrared light source or the turned-on right infrared light source to form turned-on odd-frame tracking images and turned-on even-frame tracking images.

Turned-off even-frame tracking images and turned-off odd-frame tracking images when the left infrared light source and the right infrared light source are alternately turned off in sequence are obtained based on a computer vision technology and a neural network technology according to the turned-on odd-frame tracking images and the turned-on even-frame tracking images.

The turned-on odd-frame tracking images and the turned-off even-frame tracking images are combined to form a tracking image of one eye, and the turned-on even-frame tracking images and the turned-off odd-frame tracking images are combined to form a tracking image of the other eye, so as to form binocular eyeball tracking data.

In at least one exemplary embodiment, in a process that a left tracking camera is set to correspond to a left infrared light source and a right tracking camera is set to correspond to a right infrared light source, a shooting frame rate of the left tracking camera synchronizes with a turn-on frequency of the left infrared light source; and a shooting frequency of the right tracking camera synchronizes with a turn-on frequency of the right infrared light source.

In at least one exemplary embodiment, before the left infrared light source and the right infrared light source are alternately turned on in sequence according to odd and even numbers, the method further includes the following operations.

The left infrared light source and the right infrared light source are simultaneously turned on, and the left infrared light source is tracked through the left tracking camera and the right infrared light source is tracked through the right tracking camera to form initial frame tracking images.

In at least one exemplary embodiment, a process that the left infrared light source is tracked through the left tracking camera and the right infrared light source is tracked through the right tracking camera to form initial frame tracking images includes the following operations.

The left tracking camera and the right tracking camera are respectively controlled to simultaneously shoot a left eye and a right eye of a user to obtain corneal reflection points.

Sight line vectors are calculated by taking the corneal reflection points as reference points. The sight line vectors are vectors respectively from pupils in the left eye and the right eye to the corneal reflection points.

Characteristic information of the left eye and the right eye is calculated according to the sight line vectors to form the initial frame tracking images.

In at least one exemplary embodiment, in a process that the left infrared light source and the right infrared light source are simultaneously turned on, and the left infrared light source is tracked through the left tracking camera and the right infrared light source is tracked through the right tracking camera to form initial frame tracking images, the left tracking camera and the right tracking camera are low-exposure cameras.

In a process that the left tracking camera and the right tracking camera are controlled to correspondingly shoot the turned-on left infrared light source or the turned-on right infrared light source to form turned-on odd-frame tracking images and turned-on even-frame tracking images, the left tracking camera and the right tracking camera are high-exposure cameras.

Exposure parameters of the low-exposure cameras are smaller than exposure parameters of the high-exposure cameras.

In at least one exemplary embodiment, the left infrared light source and the right infrared light source are 850 nm infrared light sources.

In at least one exemplary embodiment, a process that turned-off even-frame tracking images and turned-off odd-frame tracking images when the left infrared light source and the right infrared light source are alternately turned off in sequence are obtained based on a computer vision technology and a neural network technology according to the turned-on odd-frame tracking images and the turned-on even-frame tracking images includes the following operations.

Position coordinates of an eyeball on the turned-on odd-frame tracking image or the turned-on even-frame tracking image are obtained based on the computer vision technology.

A moving direction and a moving speed of the eyeball are estimated based on the neural network technology, a moving distance of the eyeball in two frames is estimated based on the moving speed, and a moving vector is constructed along the moving direction by taking the position coordinates as an origin and the moving distance as a length.

The embodiments of the present disclosure also provide an eyeball tracking system based on on-off of light sources, configured to implement the foregoing eyeball tracking method based on on-off of light sources. The eyeball tracking system includes eyeball tracking modules, infrared light sources, a tracking controller, and a data processor arranged in an integrated virtual reality device.

The eyeball tracking modules include a left tracking camera and a right tracking camera.

The infrared light sources include a left infrared light source and a right infrared light source. The left tracking camera corresponds to the left infrared light source and the right tracking camera corresponds to the right infrared light source.

The tracking controller is configured to control to turn on and turn off the left infrared light source and the right infrared light source, so that the left infrared light source and the right infrared light source are alternately turned on in sequence according to odd and even numbers; and control the left tracking camera and the right tracking camera to correspondingly shoot the turned-on left infrared light source or the turned-on right infrared light source to form turned-on odd-frame tracking images and turned-on even-frame tracking images.

The data processor includes an image generation module and a data fitting module.

The image generation module is configured to obtain, based on a computer vision technology and a neural network technology according to the turned-on odd-frame tracking images and the turned-on even-frame tracking images, turned-off even-frame tracking images and turned-off odd-frame tracking images when the left infrared light source and the right infrared light source are alternately turned off in sequence.

The data fitting module is configured to combine the turned-on odd-frame tracking images and the turned-off even-frame tracking images to form a tracking image of one eye, and combine the turned-on even-frame tracking images and the turned-off odd-frame tracking images to form a tracking image of the other eye, so as to form binocular eyeball tracking data.

In at least one exemplary embodiment, the infrared light sources are arranged on the periphery of the eyeball tracking modules.

In at least one exemplary embodiment, the tracking controller is further configured to simultaneously turn on the left infrared light source and the right infrared light source before alternately turning on the left infrared light source and the right infrared light source in sequence according to odd and even numbers, and track the left infrared light source through the left tracking camera and track the right infrared light source through the right tracking camera to form initial frame tracking images.

As can be concluded from the above technical solution, according to the eyeball tracking method and system based on on-off of light sources, a left tracking camera is set to correspond to a left infrared light source and a right tracking camera is set to correspond to a right infrared light source; the left infrared light source and the right infrared light source are alternately turned on in sequence according to odd and even numbers, and the left tracking camera and the right tracking camera are controlled to correspondingly shoot the turned-on left infrared light source or the turned-on right infrared light source to form turned-on odd-frame tracking images and turned-on even-frame tracking images; turned-off even-frame tracking images and turned-off odd-frame tracking images when the left infrared light source and the right infrared light source are alternately turned off in sequence are obtained based on a computer vision technology and a neural network technology according to the turned-on odd-frame tracking images and the turned-on even-frame tracking images; and the turned-on odd-frame tracking images and the turned-off even-frame tracking images are combined to form a tracking image of one eye, and the turned-on even-frame tracking images and the turned-off odd-frame tracking images are combined to form a tracking image of the other eye, so as to form binocular eyeball tracking data. Thus, the problem of mutual interference of light rays of two light sources in a tracking method of the related art is solved, thereby reducing the calculation error, improving the tracking accuracy, and providing a more perfect virtual reality immersion experience for a user.

BRIEF DESCRIPTION OF THE DRAWINGS

Other objects and results of the embodiments of the present disclosure will become more apparent and appreciated by reference to the following description taken in conjunction with the accompanying drawings, and as the disclosure becomes more fully understood. In the drawings.

DETAILED DESCRIPTION OF THE EMBODIMENTS

An eyeball tracking method of the related art mainly includes: respectively providing two eyeball tracking modules on left and right eye positions of a screen of an integrated virtual reality device, and adopting the same light source in the two eyeball tracking modules. As a result, when in calibration or use, light rays emitted by the light sources in the two eyeball tracking modules are likely to interfere with each other, especially for a user wearing myopia glasses, calculation result errors are increased, and the position accuracy of eyeball tracking is influenced.

The embodiments of the present disclosure provide an eyeball tracking method and system based on on-off of light sources. Exemplary embodiments of the present disclosure are described in detail below with reference to the accompanying drawings.

Figure 1:
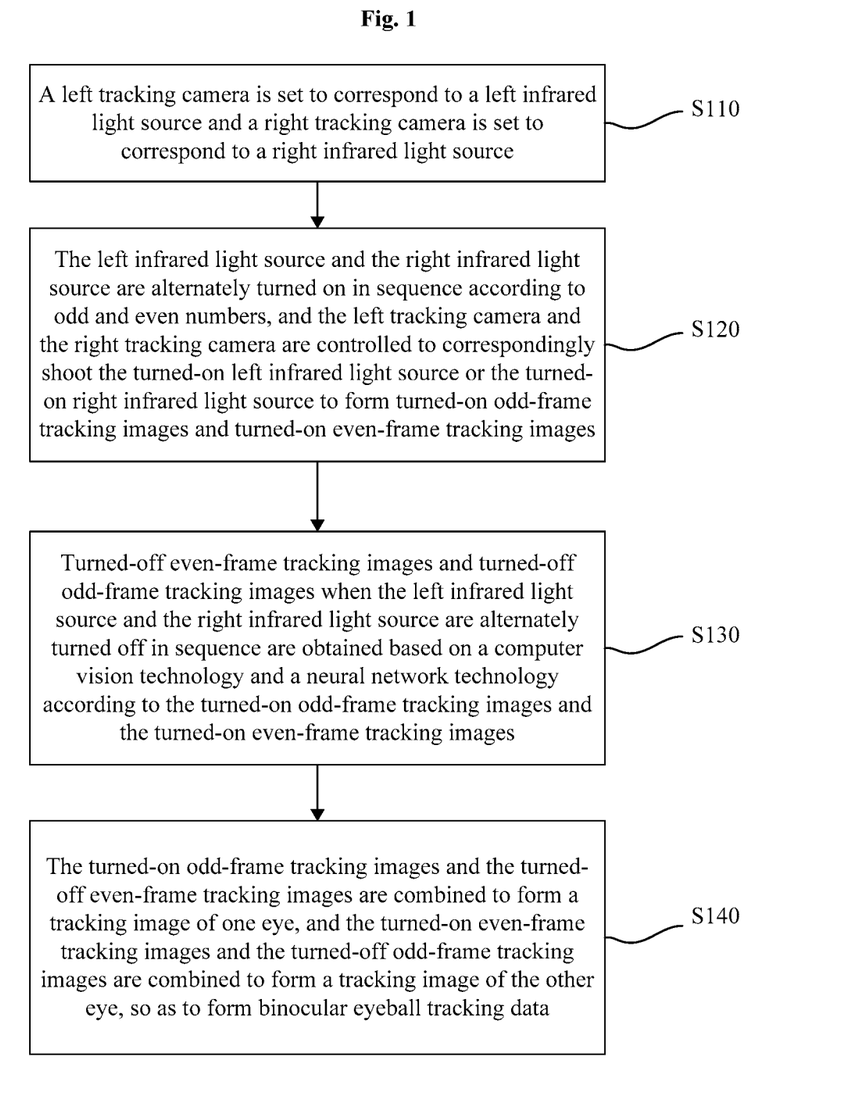
FIG. 1 is a flowchart of an eyeball tracking method based on on-off of light sources according to some embodiments of the present disclosure.
Figure 2:
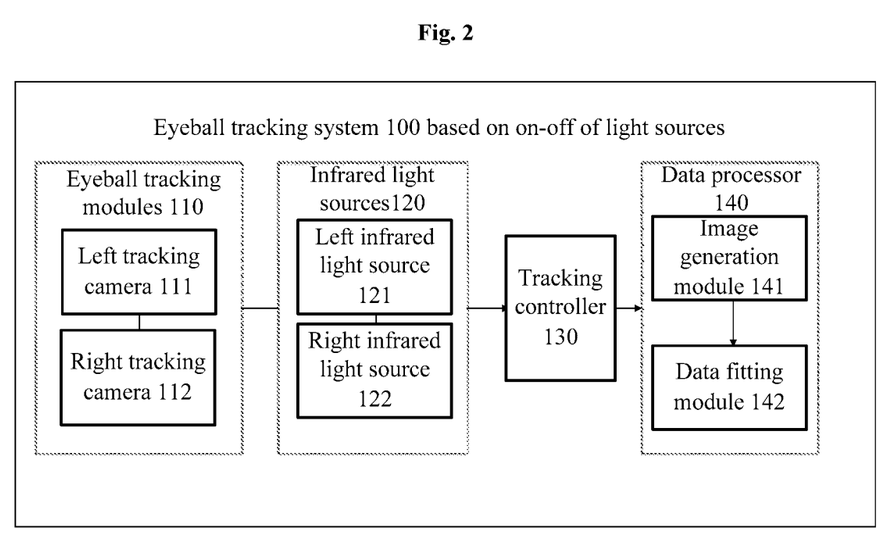
FIG. 2 is a schematic diagram of an eyeball tracking system based on on-off of light sources according to some embodiments of the present disclosure.

In order to illustrate the eyeball tracking method and system based on on-off of light sources provided by the present disclosure, FIG. 1 exemplarily illustrates an eyeball tracking method based on on-off of light sources according to some embodiments of the present disclosure, and FIG. 2 exemplarily illustrates an eyeball tracking system based on on-off of light sources according to some embodiments of the present disclosure.

The following description of exemplary embodiments is only illustrative actually, and is not used as any limitation for the present disclosure and the application or use thereof. Technologies and devices known by those of ordinary skill in the related art may not be discussed in detail. However, where appropriate, the technologies and the devices shall be regarded as part of the description.

As shown in FIG. 1, the eyeball tracking method based on on-off of light sources according to some embodiments of the present disclosure includes the following operations.

At S110, a left tracking camera is set to correspond to a left infrared light source and a right tracking camera is set to correspond to a right infrared light source.

At S120, the left infrared light source and the right infrared light source are alternately turned on in sequence according to odd and even numbers, and the left tracking camera and the right tracking camera are controlled to correspondingly shoot the turned-on left infrared light source or the turned-on right infrared light source to form turned-on odd-frame tracking images and turned-on even-frame tracking images.

At S130, turned-off even-frame tracking images and turned-off odd-frame tracking images when the left infrared light source and the right infrared light source are alternately turned off in sequence are obtained based on a computer vision technology and a neural network technology according to the turned-on odd-frame tracking images and the turned-on even-frame tracking images.

At S140, the turned-on odd-frame tracking images and the turned-off even-frame tracking images are combined to form a tracking image of one eye, and the turned-on even-frame tracking images and the turned-off odd-frame tracking images are combined to form a tracking image of the other eye, so as to form binocular eyeball tracking data.

As shown in FIG. 1, in operation S110, a shooting frame rate of the left tracking camera synchronizes with a turn-on frequency of the left infrared light source, and a shooting frequency of the right tracking camera synchronizes with a turn-on frequency of the right infrared light source. In other words, when the left infrared light source is turned on, a shutter of the left tracking camera corresponding to the left infrared light source should be opened. When the right infrared light source is turned on, a shutter of the right tracking camera corresponding to the right infrared light source should be opened. However, the state of the shutter of the other tracking camera is not limited. For example, when the right infrared light source is turned on and the right infrared light source is turned off, the left tracking camera should be opened while the right tracking camera may be or may not be opened. The specifications of the left infrared light source and the right infrared light source are not particularly limited. In some embodiments, the left infrared light source and the right infrared light source are 850 nm infrared light sources.

As shown in FIG. 1, before operation S120, the method further includes that the left infrared light source and the right infrared light source are simultaneously turned on, and the left infrared light source is tracked through the left tracking camera and the right infrared light source is tracked through the right tracking camera to form initial frame tracking images. That is, two infrared light sources (left infrared light source and right infrared light source) in a first frame should be simultaneously turned on at the beginning. In such a case, the process that the left infrared light source is tracked through the left tracking camera and the right infrared light source is tracked through the right tracking camera to form initial frame tracking images includes the following operations.

At S120-1, the left tracking camera and the right tracking camera are respectively controlled to simultaneously shoot a left eye and a right eye of a user to obtain corneal reflection points.

At S120-2, sight line vectors are calculated by taking the corneal reflection points as reference points. The sight line vectors are vectors respectively from pupils in the left eye and the right eye to the corneal reflection points.

At S120-3, characteristic information of the left eye and the right eye is calculated according to the sight line vectors to form the initial frame tracking images.

In such a case, since the two light sources are simultaneously turned on, camera exposure parameters may be set slightly lower to reduce ambient light interference. Therefore, in operation S130, when only one infrared light source (left infrared light source or right infrared light source) is turned on in sequence, the problem of light interference does not exist, so that the camera exposure parameters may be adjusted to be higher so that the camera clearly shoots image data of eyeballs and areas around the eyeballs. That is, in a process that the left tracking camera and the right tracking camera are controlled to correspondingly shoot the turned-on left infrared light source or the turned-on right infrared light source to form turned-on odd-frame tracking images and turned-on even-frame tracking images, the left tracking camera and the right tracking camera are high-exposure cameras. In a process that the left infrared light source and the right infrared light source are simultaneously turned on, and the left infrared light source is tracked through the left tracking camera and the right infrared light source is tracked through the right tracking camera to form initial frame tracking images, the left tracking camera and the right tracking camera are low-exposure cameras. Moreover, exposure parameters of the low-exposure cameras are smaller than exposure parameters of the high-exposure cameras.

As shown in FIG. 1, in operation S120, the left infrared light source and the right infrared light source are alternately turned on in sequence according to odd and even numbers, and the left tracking camera and the right tracking camera are controlled to correspondingly shoot the turned-on left infrared light source or the turned-on right infrared light source to form turned-on odd-frame tracking images and turned-on even-frame tracking images.

For example, the left infrared light source and the right infrared light source are alternately turned on in sequence according to odd and even numbers. That is, after the initial frame tracking image is shot, a first frame of image may be shot when the left infrared light source or the right infrared light source is turned on. In some embodiments, for example, the left infrared light source is turned on in a first frame of image. Firstly, when the first frame of image is shot, the left infrared light source corresponding to the left tracking camera is turned on while the right infrared light source corresponding to the right tracking camera is turned off. When a second frame of image is shot, the right infrared light source corresponding to the right tracking camera is turned on while the left infrared light source corresponding to the left tracking camera is turned off. When a third frame of image is shot, the left infrared light source corresponding to the left tracking camera is turned on while the right infrared light source corresponding to the right tracking camera is turned off. By analogy, the left and right infrared light sources are alternately turned on and off in sequence. That is, in case of odd frames, the left infrared light source is turned on while the right infrared light source is turned off, and in case of even frames, the right infrared light source is turned on while the left infrared light source is turned off. Certainly, in some exemplary implementation, the situation may be on the contrary, and descriptions are omitted herein. Thus, only one infrared light source is turned on in each frame, the problem of mutual interference of two light sources can be avoided, and eyeball tracking stability is improved. Moreover, a camera exposure parameter value corresponding to each frame of infrared light source that is turned off may be set as a relatively large parameter value, so that the camera can clearly shoot image data of the eyeballs and the areas around the eyeballs.

As shown in FIG. 1, the process that turned-off even-frame tracking images and turned-off odd-frame tracking images when the left infrared light source and the right infrared light source are alternately turned off in sequence are obtained based on a computer vision technology and a neural network technology according to the turned-on odd-frame tracking images and the turned-on even-frame tracking images in operation S130 includes the following operations.

Position coordinates of an eyeball on the turned-on odd-frame tracking image or the turned-on even-frame tracking image are obtained based on the computer vision technology.

A moving direction and a moving speed of the eyeball are estimated based on the neural network technology, a moving distance of the eyeball in two frames is estimated based on the moving speed, and a moving vector is constructed along the moving direction by taking the position coordinates as an origin and the moving distance as a length. As the previous example, in a case where the first frame of image is shot when the left infrared light source is turned on, and the second frame of image is shot when the left infrared light source is turned off, no trace about the left eye is shot on the tracking image of the second frame, so that a motion trace (moving vector) of the left eye when the second frame is shot needs to be estimated by combining the computer vision technology and the neural network technology to complete the tracking of the left eye in the second frame of image.

As shown in FIG. 1, in operation S140, the turned-on odd-frame tracking images and the turned-off even-frame tracking images are combined to form a tracking image of one eye, and the turned-on even-frame tracking images and the turned-off odd-frame tracking images are combined to form a tracking image of the other eye, so as to form binocular eyeball tracking data. As the previous example, in a case where the first frame of image is shot when the left infrared light source is turned on, and the second frame of image is shot when the left infrared light source is turned off, the left eye of the user is tracked by the left tracking camera in odd frames such as the first frame and the third frame, and the motion trace of the left eye is estimated in even frames such as the second frame and the fourth frame by combining the computer vision technology and the neural network technology. Therefore, a tracking image of the left eye is formed by combining the turned-on odd-frame tracking images and the turned-off even-frame tracking images. In the same way for the right eye, a tracking image of the right eye is formed by combining the turned-on even-frame tracking images and the turned-off odd-frame tracking images. In this way, binocular eyeball tracking data is formed so as to complete eyeball tracking.

As described above, according to the eyeball tracking method based on on-off of light sources, a left tracking camera is set to correspond to a left infrared light source and a right tracking camera is set to correspond to a right infrared light source; the left infrared light source and the right infrared light source are alternately turned on in sequence according to odd and even numbers, and the left tracking camera and the right tracking camera are controlled to correspondingly shoot the turned-on left infrared light source or the turned-on right infrared light source to form turned-on odd-frame tracking images and turned-on even-frame tracking images; turned-off even-frame tracking images and turned-off odd-frame tracking images when the left infrared light source and the right infrared light source are alternately turned off in sequence are obtained based on a computer vision technology and a neural network technology according to the turned-on odd-frame tracking images and the turned-on even-frame tracking images; and the turned-on odd-frame tracking images and the turned-off even-frame tracking images are combined to form a tracking image of one eye, and the turned-on even-frame tracking images and the turned-off odd-frame tracking images are combined to form a tracking image of the other eye, so as to form binocular eyeball tracking data. Thus, the problem of mutual interference of light rays of two light sources in a tracking method of the related art is solved, thereby reducing the calculation error, improving the tracking accuracy, and providing a more perfect virtual reality immersion experience for a user.

As shown in FIG. 2, the embodiments of the present disclosure also provide an eyeball tracking system 100 based on on-off of light sources, configured to implement the foregoing eyeball tracking method based on on-off of light sources. The eyeball tracking system includes eyeball tracking modules 110, infrared light sources 120, a tracking controller 130, and a data processor 140 arranged in an integrated virtual reality device.

The eyeball tracking modules 110 include a left tracking camera 111 and a right tracking camera 112.

The infrared light sources 120 include a left infrared light source 121 and a right infrared light source 122. The left tracking camera 111 corresponds to the left infrared light source 121 and the right tracking camera 112 corresponds to the right infrared light source 122. The infrared light source 120 is arranged on the periphery of the eyeball tracking module 110.

The tracking controller 130 is configured to control to turn on and turn off the left infrared light source 121 and the right infrared light source 122, so that the left infrared light source 121 and the right infrared light source 122 are alternately turned on in sequence according to odd and even numbers; and control the left tracking camera 111 and the right tracking camera 112 to correspondingly shoot the turned-on left infrared light source 121 or right infrared light source 122 to form turned-on odd-frame tracking images and turned-on even-frame tracking images. The tracking controller 130 is further configured to simultaneously turn on the left infrared light source 121 and the right infrared light source 122 before alternately turning on the left infrared light source 121 and the right infrared light source 122 in sequence according to odd and even numbers, track the left infrared light source 121 through the left tracking camera 111, and track the right infrared light source 122 through the right tracking camera 112 to form initial frame tracking images.

The data processor 140 includes an image generation module 141 and a data fitting module 142.

The image generation module 141 is configured to obtain, based on a computer vision technology and a neural network technology according to the turned-on odd-frame tracking images and the turned-on even-frame tracking images, turned-off even-frame tracking images and turned-off odd-frame tracking images when the left infrared light source and the right infrared light source are alternately turned off in sequence.

The data fitting module 142 is configured to combine the turned-on odd-frame tracking images and the turned-off even-frame tracking images to form a tracking image of one eye, and combine the turned-on even-frame tracking images and the turned-off odd-frame tracking images to form a tracking image of the other eye, so as to form binocular eyeball tracking data.

As can be concluded from the above implementation, the eyeball tracking system based on on-off of light sources provided by the present disclosure includes eyeball tracking modules, infrared light sources, a tracking controller, and a data processor. A left tracking camera is set to correspond to a left infrared light source and a right tracking camera is set to correspond to a right infrared light source; the left infrared light source and the right infrared light source are alternately turned on in sequence according to odd and even numbers, and the left tracking camera and the right tracking camera are controlled to correspondingly shoot the turned-on left infrared light source or the turned-on right infrared light source to form turned-on odd-frame tracking images and turned-on even-frame tracking images; and turned-off even-frame tracking images and turned-off odd-frame tracking images when the left infrared light source and the right infrared light source are alternately turned off in sequence are obtained according to the turned-on odd-frame tracking images and the turned-on even-frame tracking images, so that the two tracking images are combined to form a monocular tracking image. The problems that when in calibration or use, light rays emitted by two light sources are likely to interfere with each other, especially for a user wearing myopia glasses, calculation result errors are increased, and the position accuracy of eyeball tracking is influenced since two eyeball tracking modules respectively adopt a light source in the related art are solved, thereby reducing errors, improving the tracking accuracy, and providing a more perfect virtual reality immersion experience for a user.

The eyeball tracking method and system based on on-off of light sources proposed according to the embodiments of the present disclosure are described above by way of example with reference to the accompanying drawings. However, those having ordinary skill in the art should understand that various improvements can be made to the eyeball tracking method and system based on on-off of light sources proposed in the embodiments of the present disclosure, without departing from the content of the present disclosure. Therefore, the scope of protection of the present disclosure should be determined by the content of the appended claims.

Specific examples in the embodiments may refer to the examples described in the above embodiments and exemplary implementations, and details are not described herein in some embodiments.

It is apparent that those having ordinary skill in the art should understand that the above modules or operations of the embodiments of the present disclosure may be implemented by a general-purpose computing device, and they may be centralized on a single computing device or distributed on a network composed of multiple computing devices. They may be implemented with program codes executable by a computing device, so that they may be stored in a storage device and executed by the computing device, and in some cases, the operations shown or described may be performed in a different order than here, or they are separately made into individual integrated circuit modules, or multiple modules or operations therein are made into a single integrated circuit module for implementation. As such, the present disclosure is not limited to any particular combination of hardware and software.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

INDUSTRIAL APPLICABILITY

As described above, an eyeball tracking method based on on-off of light sources according to some embodiments of the present disclosure has the following beneficial effects: a left tracking camera is set to correspond to a left infrared light source and a right tracking camera is set to correspond to a right infrared light source; the left infrared light source and the right infrared light source are alternately turned on in sequence according to odd and even numbers, and the left tracking camera and the right tracking camera are controlled to correspondingly shoot the turned-on left infrared light source or the turned-on right infrared light source to form turned-on odd-frame tracking images and turned-on even-frame tracking images; turned-off even-frame tracking images and turned-off odd-frame tracking images when the left infrared light source and the right infrared light source are alternately turned off in sequence are obtained based on a computer vision technology and a neural network technology according to the turned-on odd-frame tracking images and the turned-on even-frame tracking images; and the turned-on odd-frame tracking images and the turned-off even-frame tracking images are combined to form a tracking image of one eye, and the turned-on even-frame tracking images and the turned-off odd-frame tracking images are combined to form a tracking image of the other eye, so as to form binocular eyeball tracking data. Thus, the problem of mutual interference of light rays of two light sources in a tracking method of the related art is solved, thereby reducing the calculation error, improving the tracking accuracy, and providing a more perfect virtual reality immersion experience for a user.

What is claimed is:

1. An eyeball tracking method, comprising:
   setting a left tracking camera to correspond to a left infrared light source and a right tracking camera to correspond to a right infrared light source;
   alternately turning on the left infrared light source and the right infrared light source in sequence according to odd and even numbers, and controlling the left tracking camera and the right tracking camera to correspondingly shoot when the left infrared light source is turned on or the right infrared light source is turned on to form turned-on odd-frame tracking images and turned-on even-frame tracking images;
   generating, according to the turned-on odd-frame tracking images and the turned-on even-frame tracking images, turned-off even-frame tracking images and turned-off odd-frame tracking images when the left infrared light source and the right infrared light source are alternately turned off in sequence, comprising:
      obtaining position coordinates of an eyeball on the turned-on odd-frame tracking image or the turned-on even-frame tracking image based on the computer vision technology;
      estimating a moving direction and a moving speed of the eyeball based on the neural network technology, estimating a moving distance of the eyeball in two frame tracking images based on the moving speed, and constructing a moving vector along the moving direction by taking the position coordinates as an origin and the moving distance as a length;
      based on the moving vector, tracking a left eye in turned-off odd-frames to generate the turned-off odd-frame tracking images and tracking a right eye in turned-off even-frames to generate the turned-off even-frame tracking images; and
   combining the turned-on odd-frame tracking images and the turned-off even-frame tracking images to form a tracking image of one eye, and combining the turned-on even-frame tracking images and the turned-off odd-frame tracking images to form a tracking image of the other eye, so as to form binocular eyeball tracking data.

2. The eyeball tracking method of claim 1, further comprising:
   in a process of setting a left tracking camera to correspond to a left infrared light source and a right tracking camera to correspond to a right infrared light source,
   a shooting frame rate of the left tracking camera synchronizes with a turn-on frequency of the left infrared light source; and
   a shooting frequency of the right tracking camera synchronizes with a turn-on frequency of the right infrared light source.

3. The eyeball tracking method of claim 1, before alternately turning on the left infrared light source and the right infrared light source in sequence according to odd and even numbers, further comprising:
   simultaneously turning on the left infrared light source and the right infrared light source, and tracking the left infrared light source through the left tracking camera and tracking the right infrared light source through the right tracking camera to form initial frame tracking images.

4. The eyeball tracking method of claim 3, wherein tracking the left infrared light source through the left tracking camera and tracking the right infrared light source through the right tracking camera to form initial frame tracking images comprises:
   respectively controlling the left tracking camera and the right tracking camera to simultaneously shoot a left eye and a right eye of a user to obtain corneal reflection points;
   calculating sight line vectors by taking the corneal reflection points as reference points, the sight line vectors being vectors respectively from pupils in the left eye and the right eye to the corneal reflection points; and
   calculating characteristic information of the left eye and the right eye according to the sight line vectors to form the initial frame tracking images.

5. The eyeball tracking method of claim 4, wherein
   in a process of simultaneously turning on the left infrared light source and the right infrared light source, and tracking the left infrared light source through the left tracking camera and tracking the right infrared light source through the right tracking camera to form initial frame tracking images, the left tracking camera and the right tracking camera are set to low-exposure cameras;
   in a process of controlling the left tracking camera and the right tracking camera to correspondingly shoot when the left infrared light source is turned on or the right infrared light source is turned on to form turned-on odd-frame tracking images and turned-on even-frame tracking images, the left tracking camera and the right tracking camera are set to high-exposure cameras; and
   exposure parameters of the low-exposure cameras are smaller than exposure parameters of the high-exposure cameras.

6. The eyeball tracking method of claim 5, wherein the left infrared light source and the right infrared light source are 850 nm infrared light sources.

7. An eyeball tracking system, configured to implement the eyeball tracking method of claim 1, the eyeball tracking system comprising eyeball tracking modules, infrared light sources, a tracking controller, and a data processor arranged in an integrated virtual reality device, wherein
   the eyeball tracking modules comprise a left tracking camera and a right tracking camera;
   the infrared light sources comprise a left infrared light source and a right infrared light source, wherein the left tracking camera corresponds to the left infrared light source and the right tracking camera corresponds to the right infrared light source;
   the tracking controller is configured to control to turn on and turn off the left infrared light source and the right infrared light source, so that the left infrared light source and the right infrared light source are alternately turned on in sequence according to odd and even numbers;
   and control the left tracking camera and the right tracking camera to correspondingly shoot when the left infrared light source is turned on or the right infrared light source is turned on to form turned-on odd-frame tracking images and turned-on even-frame tracking images;
   the data processor is configured to:
   generate, according to the turned-on odd-frame tracking images and the turned-on even-frame tracking images, turned-off even-frame tracking images and turned-off odd-frame tracking images when the left infrared light source and the right infrared light source are alternately turned off in sequence; comprising: obtaining position coordinates of an eyeball on the turned-on odd-frame tracking image or the turned-on even-frame tracking image based on the computer vision technology; estimating a moving direction and a moving speed of the eyeball based on the neural network technology, estimating a moving distance of the eyeball in two frame tracking images based on the moving speed, and constructing a moving vector along the moving direction by taking the position coordinates as an origin and the moving distance as a length; and, based on the moving vector, tracking a left eye in turned-off odd-frames to generate the turned-off odd-frame tracking images and tracking a right eye in turned-off even-frames to generate the turned-off even-frame tracking images; and combine the turned-on odd-frame tracking images and the turned-off even-frame tracking images to form a tracking image of one eye, and combine the turned-on even-frame tracking images and the turned-off odd-frame tracking images to form a tracking image of the other eye, so as to form binocular eyeball tracking data.

8. The eyeball tracking system of claim 7, wherein the infrared light sources are arranged on the periphery of the eyeball tracking modules.

9. The eyeball tracking system of claim 8, wherein the tracking controller is further configured to simultaneously turn on the left infrared light source and the right infrared light source before alternately turning on the left infrared light source and the right infrared light source in sequence, and track the left infrared light source through the left tracking camera and track the right infrared light source through the right tracking camera to form initial frame tracking images.

10. A non-transitory computer-readable storage medium, having a computer program stored thereon which, when executed by a processor, implements the method according to claim 1.

11. An electronic device, comprising a memory and a processor, wherein the memory stores a computer program, and the processor is configured to execute the computer program to perform the method according to claim 1.

12. The eyeball tracking system of claim 7, wherein
a shooting frame rate of the left tracking camera synchronizes with a turn-on frequency of the left infrared light source; and
a shooting frequency of the right tracking camera synchronizes with a turn-on frequency of the right infrared light source.

13. The eyeball tracking system of claim 9, wherein
the tracking controller is further configured to respectively control the left tracking camera and the right tracking camera to simultaneously shoot a left eye and a right eye of a user to obtain corneal reflection points; and
the data processor is further configured to:
calculate sight line vectors by taking the corneal reflection points as reference points, the sight line vectors being vectors respectively from pupils in the left eye and the right eye to the corneal reflection points; and
calculate characteristic information of the left eye and the right eye according to the sight line vectors to form the initial frame tracking images.

14. The eyeball tracking system of claim 13, wherein
the left tracking camera and the right tracking camera are set to low-exposure cameras when the tracking controller is configured to simultaneously turn on the left infrared light source and the right infrared light source, and track the left infrared light source through the left tracking camera and track the right infrared light source through the right tracking camera to form initial frame tracking images;
the left tracking camera and the right tracking camera are set to high-exposure cameras when the tracking controller is configured to control the left tracking camera and the right tracking camera to correspondingly shoot when the left infrared light source is turned on or the right infrared light source is turned on to form turned-on odd-frame tracking images and turned-on even-frame tracking images,
wherein exposure parameters of the low-exposure cameras are smaller than exposure parameters of the high-exposure cameras.

15. The eyeball tracking system of claim 14, wherein the left infrared light source and the right infrared light source are 850 nm infrared light sources.

16. A non-transitory computer-readable storage medium, having a computer program stored thereon which, when executed by a processor, implements the method according to claim 2.

17. A non-transitory computer-readable storage medium, having a computer program stored thereon which, when executed by a processor, implements the method according to claim 3.

18. A non-transitory computer-readable storage medium, having a computer program stored thereon which, when executed by a processor, implements the method according to claim 4.

* * * * *